March 2, 1965   K. H. FOSKETT   3,171,909
BY-PASS METER SOCKET
Original Filed Aug. 13, 1959
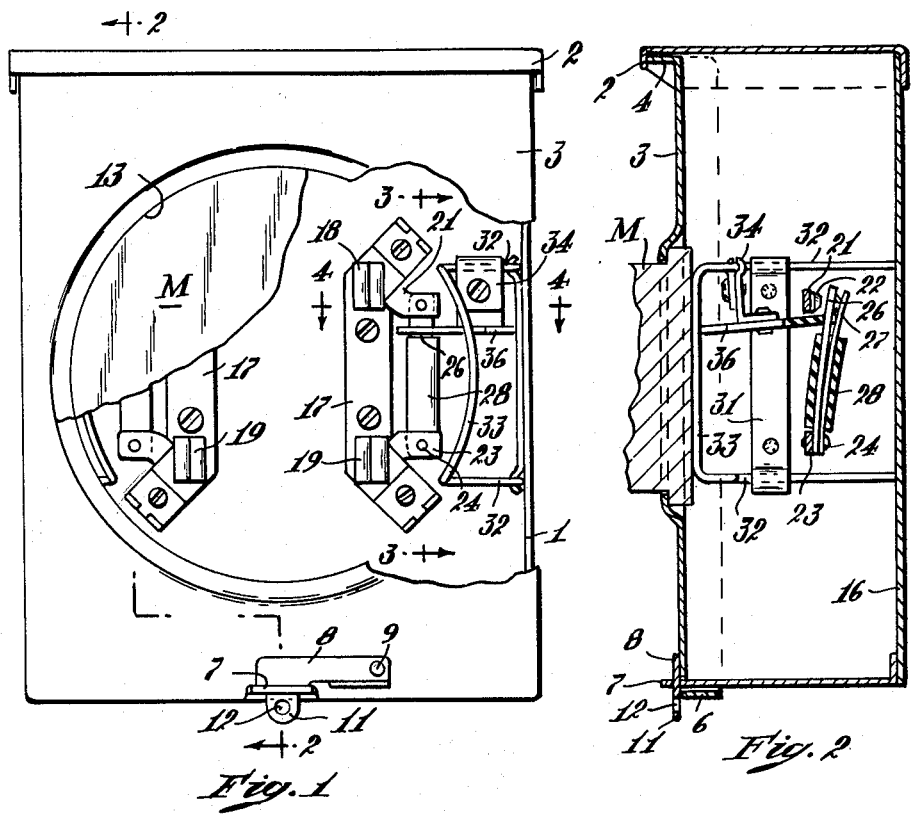
Fig. 1
Fig. 2
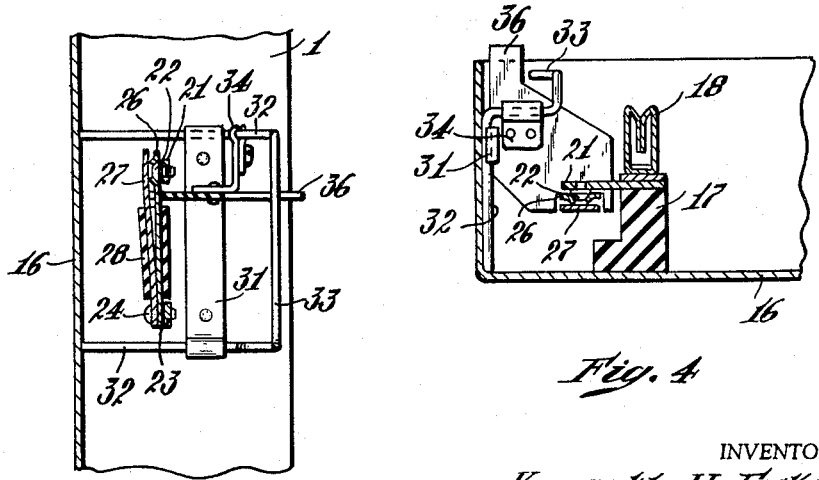
Fig. 3
Fig. 4
INVENTOR.
Kenneth H. Foskett
BY
Roberts, Cushman & Grover
ATT'YS United States Patent Office 3,171,909
Patented Mar. 2, 1965

3,171,909
BY-PASS METER SOCKET
Kenneth H. Foskett, Manchester, N.H., assignor to Basic Products Corporation, Milwaukee, Wis., a corporation of Wisconsin
Continuation of application Ser. No. 833,550, Aug. 13, 1959. This application July 18, 1962, Ser. No. 210,737
8 Claims. (Cl. 200—51.1)

This application is a continuation of application Serial No. 833,550, filed August 13, 1959, now abandoned.

While this invention is useful with any plug-in instrument which is sealed in place, it is particularly useful with watt-hour meters which are sealed in well-known manner to prevent unauthorized access to the interior of the sockets. When such instruments are removed for testing or repairs it is desirable to by-pass the socket jaws into which the meter blades are plugged so that the current is not interrupted. Various by-passes have been proposed but none of them has been entirely satisfactory.

Objects of the present invention are to provide a by-pass which cannot be closed while the meter is sealed, which can be closed before the meter is removed, which can be applied to a socket merely by adding a few simple parts without replacing any existing parts, which cannot be opened accidentally, which is visible and easily accessible when the meter is removed, and which is durable and reliable in use.

According to this invention the socket comprises a box having an open front and one or more pairs of jaws to receive a plug-in meter or the like having a laterally projecting portion, together with a cover having an opening for the meter and fitting over the aforesaid portion so that the meter cannot be removed until the cover is removed, a by-pass for interconnecting the jaws, and an actuator for opening the by-pass, the actuator projecting through the open front so that the by-pass is positively opened when the cover is closed. Preferably the by-pass comprises a contact connected to one jaw and a switch connected to the other jaw, the switch being movable into engagement with the contact. In the preferred embodiment the socket has a stop for limiting the extent to which the meter may be inserted through said opening, the actuator being movably mounted on the stop. In a more specific aspect the stop comprises a wire bail having a central portion disposed behind the meter opening and end portions mounted on the box, the actuator being mounted on one of the end portions.

For the purpose of illustration a typical embodiment of the invention is shown in the accompanying drawings in which FIG. 1 is a front view with portions of the meter and cover broken away;

FIG. 2 is a section on line 2—2 of FIG. 1 showing the outline of the base portion of the meter;

FIG. 3 is a section on line 3—3 of FIG. 1; and

FIG. 4 is a section on line 4—4 of FIG. 1.

In the illustration the invention is shown as applied to a socket of well-known construction comprising a rectangular box 1 having an open front and a depending flange 2 extending around the top (FIGS. 1 and 2). The cover 3 has a forwardly projecting flange 4 fitting behind the flange 2 and a flange 6 telescoping over the sides and bottom of the box. The bottom of the box has a forwardly projecting ear 7 extending through a slot in the cover and a latch 8 is pivoted to the forward side of the cover at 9, the latch having a tongue 11 extending through a slot in the ear 7 to latch the cover in closed position. The tongue 11 has an opening 12 to receive a seal. The cover has a central opening 13 to accommodate the meter M and around the opening a flange to engage over the base of the meter so that the meter cannot be removed until the cover is first removed. Mounted on the back 16 of the box are blocks of insulation 17 carrying pairs of jaws 18 and 19 to receive the blades of a plug-in meter in well-known manner.

According to the present invention the by-pass comprises a contact 21 disposed between the blocks 17 and the jaws 18, the contact having a rearwardly facing point 22. Mounted under each jaw 19 in similar manner is an arm 23 on which is mounted by means of a screw 24 a switch 26 having a recess in its free end to receive the contact point 22. While the switch may be made of resilient material which tends to move it against the contact 22, preferably it is backed by a leaf spring 27. Preferably the switch 26 and spring 27 are surrounded by a tube of insulation 28.

Fast to the inner faces of the side walls of the box are plates 31 the upper and lower ends of which are bent to provide sockets for the legs 32 of a bail the central portion 33 of which projects into the meter opening and is curved to conform to the outline of the meter opening as shown in FIG. 1. Pivotally mounted on the upper side of each bail is an L-shaped arm 34 carrying an elongate actuator 36 the inner end of which engages the switch 26 near its free end and the outer end of which projects ito the path of the cover so that the parts 34-36 swing, counterclockwise in FIG. 2 and clockwise in FIG. 3, to open the switch when the cover is closed.

When the meter is to be removed the cover must first be removed at which time the switches 26 spring to closed position, thereby to by-pass the meter jaws 18-19 so that current is not interrupted. When the meter is to be installed it must be plugged in before the cover is closed and when the cover is closed the by-passes are opened automatically.

From the foregoing it will be understood that the bail 33 serves not only to support the actuators 34-36 but also to limit the extent to which the meter may be pushed into the socket (see FIG. 2).

It should be understood that the present disclosure is for the purpose of illustration only and that this invention includes all modifications and equivalents which fall within the scope of the appended claims.

I claim:

1. A socket comprising a box having an open front and a pair of jaws to receive a plug-in meter or the like having a laterally projecting portion, a cover having an opening for the meter and fitting over said portion so that the meter cannot be removed until the cover is removed, a by-pass for interconnecting said jaws, an actuator for opening the by-pass, the actuator projecting through said open front into the path of said cover so that the by-pass is positively opened when the cover is closed, a stop for limiting the extent to which the meter may be inserted into the socket, said actuator being movably mounted on said stop, and the stop being detachably connected to the box so that the actuator may be removed readily.

2. A socket comprising a box having an open front and a pair of jaws to receive a plug-in meter or the like having a laterally projecting portion, a cover having an opening for the meter and fitting over said portion so that the meter cannot be removed until the cover is removed, a by-pass for interconnecting said jaws, an actuator for opening the by-pass, the actuator projecting through said open front into the path of said cover so that the by-pass is positively opened when the cover is closed, a stop for limiting the extent to which the meter may be inserted into the socket, said actuator being movably mounted on said stop, the stop being detachably connected to the box so that the actuator may be removed readily and the stop comprises a wire bail having a portion disposed behind said meter opening and another portion mounted on the box, the actuator being mounted on the latter portion.

3. A socket according to claim 2, further characterized in that the stop comprises a wire bail having a central portion disposed behind said meter opening and end portions mounted on the box, the actuator being mounted on one of the end portions.

4. A socket comprising a box having a back, an open front to receive a plug-in meter or the like having a laterally projecting portion, a cover having an opening for the meter and fitting over said portion so that the meter cannot be removed until the cover is removed, and a stop mounted in the box with a portion behind said opening adjacent the periphery thereof to engage said laterally projecting portion and limit the extent to which a meter may be inserted into the box.

5. A socket according to claim 4, further characterized in that said stop has a supporting part which extends from said portion behind said cover.

6. A socket according to claim 5, further characterized in that the stop also has an attaching part which extends from said part toward said back.

7. A socket comprising a box having a back, an open front to receive a plug-in meter or the like having a laterally projecting portion, a cover having an opening for the meter and fitting over said portion so that the meter cannot be removed until the cover is removed, and a stop mounted in the box with a portion behind said opening adjacent the periphery thereof to engage said laterally projecting portion and limit the extent to which a meter may be inserted into the box, said stop comprising a bail having its central portion constituting said portion and supporting legs extending behind said cover and thence toward said back.

8. A socket comprising a box having an open front and a pair of jaws to receive a plug-in meter or the like having a laterally-projecting portion, a cover having an opening for the meter and fitting over said portion so that the meter cannot be removed until the cover is removed, a by-pass for interconnecting said jaws, an actuator for opening the by-pass, and means supporting the actuator so that it projects through said open front when the cover is removed, the actuator being so placed that it is positively operated by the cover to open the by-pass when the cover is closed.

References Cited in the file of this patent
UNITED STATES PATENTS

| | | |
|---|---|---|
| 2,286,044 | West et al. | June 9, 1942 |
| 2,819,358 | Waldrop | Jan. 7, 1958 |
| 2,825,879 | Moore | Mar. 4, 1958 |